United States Patent [19]
Swan et al.

[11] Patent Number: 5,205,101
[45] Date of Patent: Apr. 27, 1993

[54] SUPPORT SYSTEM

[76] Inventors: David Swan, 12078 Fleetwood Cir., Coon Rapids, Minn. 55448; Michale Emerson, 181 90th La., Blaine, Minn. 55434

[21] Appl. No.: 715,576

[22] Filed: Jun. 14, 1991

[51] Int. Cl.$^5$ .............................................. E04H 3/10
[52] U.S. Cl. ........................................ 52/650.1; 52/6; 52/126.1; 52/721; 52/DIG. 10; 411/344
[58] Field of Search ................ 472/75; 52/646, 126.1, 52/6, 721, 648, DIG. 10; 411/549, 552, 553, 554, 555, 344

[56] References Cited
U.S. PATENT DOCUMENTS 2,408,560 10/1946 Keehn .................................. 411/344
2,803,088 8/1957 Swann ........................... 52/DIG. 10
4,512,117 4/1985 Lange ........................................ 52/6

*Primary Examiner*—David A. Scherbel
*Assistant Examiner*—Wynn E. Wood
*Attorney, Agent, or Firm*—Herman H. Bains

[57] ABSTRACT

A support system for supporting lights, T.V. monitors and similar devices includes sectional rail structures comprising identical rails interconnected together in end-to-end relation. Rails are also connected to directional coupling members in angular relation therewith. Quick-connect, overcenter toggle connector devices interconnect the rails together in end-to-end relation and also interconnect rails to coupling members in angular relation.

7 Claims, 4 Drawing Sheets

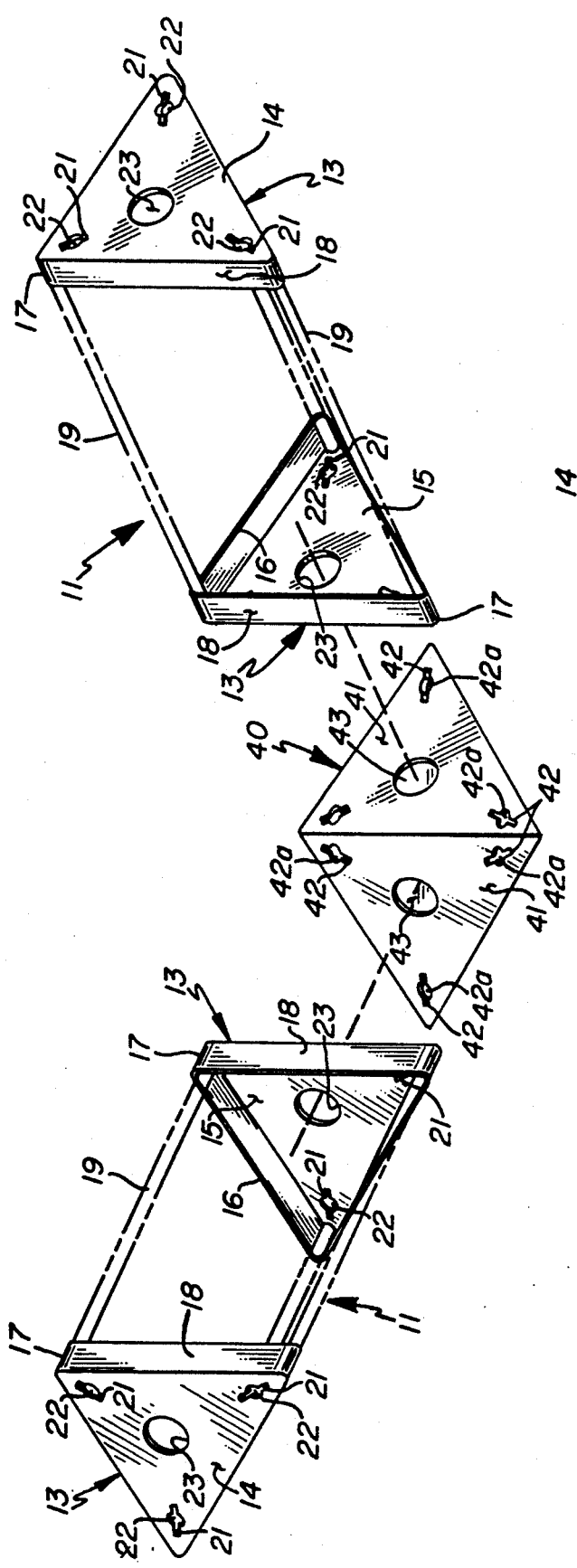
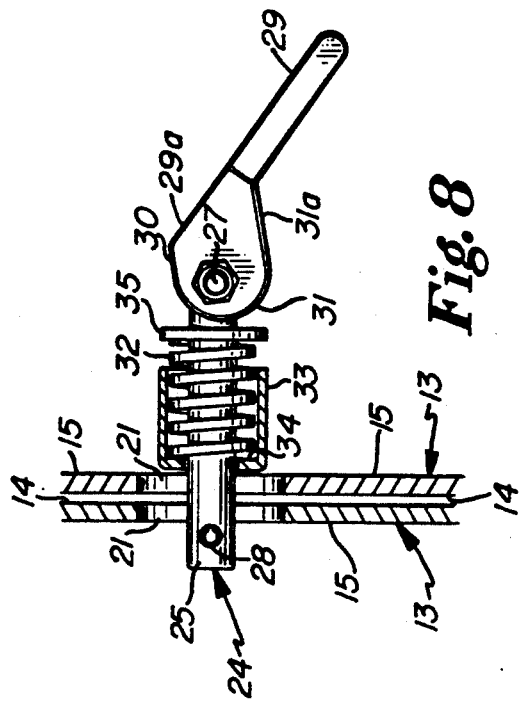
Fig. 7
Fig. 8

SUPPORT SYSTEM

FIELD OF THE INVENTION

This invention relates to a support system for use in supporting various devices such as light systems, T.V. monitors and similar devices.

BACKGROUND OF THE INVENTION

Support systems, such as the systems typically used in the entertainment industry, support lighting systems, T.V. monitors and similar devices. Such support systems are usually erected for temporary use during a concert or an entertainment event. Since the size and configuration of such systems (when used for lighting) will be dependent on the particular requirements of the event to be performed, a support system should be adaptable with respect to its size and configuration. This kind of support system should also be capable of ready assembly and disassembly. Prior art support systems are somewhat limited in their potential configuration and are not capable of ready assembly and disassembly.

SUMMARY OF THE INVENTION

It is an object of this invention to provide a novel support system, of simple and inexpensive construction, which may be erected in a variety of configurations and sizes, and which may be readily assembled and disassembled.

Another object of this invention is to provide a novel basic rail unit for the support system in which rail units are readily interconnected together in end-to-end relation by quick connect toggle connectors to quickly form rails of varying lengths.

A further object of this invention is to provide a novel support system including directional coupling members which may vary in configuration and size for ready connection to rail units and thereby permit erection of support systems having a wide range of configurations.

The support system is comprised of three basic components, namely, rails, directional coupling members and connectors. The rails include a plurality of elongate parallel longitudinal rail elements which are rigidly connected to transverse rail elements. End plates are fixidly connected to the longitudinal rail elements and each end plate has a plurality of openings therein arranged in a predetermined pattern.

The connectors are used to connect rails together in end-to-end relation and are also used to connect rails to directional coupling members. The connectors comprise quick-connect, over center toggle connector devices, each including a pair of toggle links pivotally connected together for pivotal movement between locked and released positions. The connector devices are inserted through registering openings in the abutting end plates of a pair of rails disposed in end-to-end relation, and the connector devices are then manipulated into locking position to quickly interconnect the rails together. Conversely, the rails may be easily and quickly disconnected by manipulation of the connector devices to the release position.

The directional coupling members are hollow structures including box-like members, pyramidal members, or similar multi-sided members each having a plurality of openings in each side arranged in the same pattern as the patterns in the end plates. Rails are connected to the directional coupling members by the connector devices to permit angular change in direction of the support systems.

FIGURES OF THE DRAWING

FIG. 1 is a diagrammatic perspective view illustrating a typical configuration of the support system, FIG. 2 is a perspective view of the basic rail, FIG. 3 is a perspective view of one embodiment of a directional coupling member, FIG. 4 is a perspective view of a different embodiment of a directional coupling member, FIG. 5 is an elevational view of a connector device illustrated in the locked position, FIG. 6 is a cross-sectional view of the rail illustrated in FIG. 2 illustrating details of construction thereof, FIG. 7 is an exploded diagrammatic view illustrating the manner in which the pair of rails are connected to the directional coupling member illustrated in FIG. 4 and, FIG. 8 is a side elevational view similar to FIG. 5 but illustrating a connector device in the release position.

DESCRIPTION OF THE PREFERRED EMBODIMENT

Figure 1:
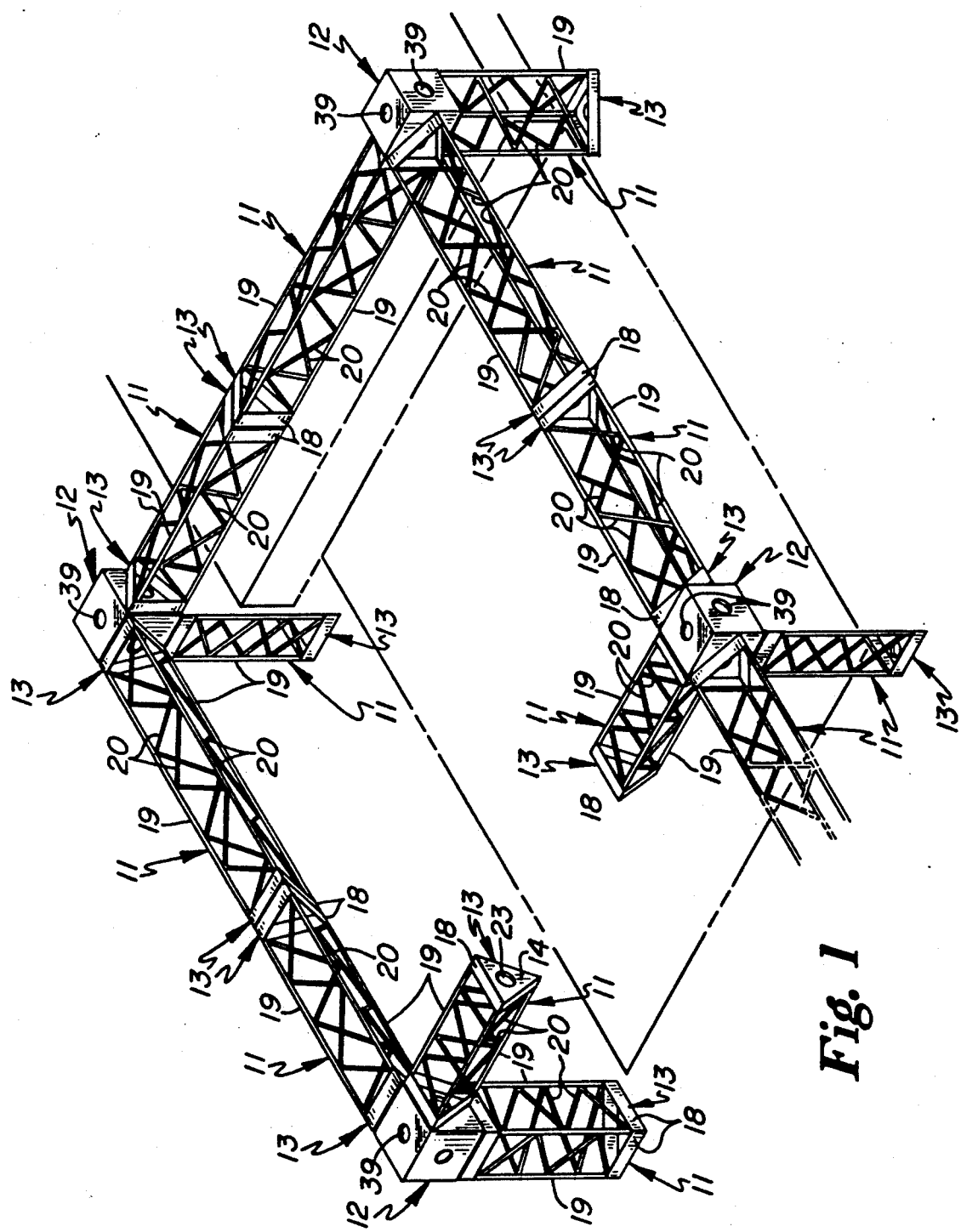

Referring now to the drawings and more specifically to FIG. 1, it will be seen that one embodiment of the novel support system, designated generally by the reference numeral 10, is thereshown. The support system 10 includes a plurality of interconnected rails 11 which are also interconnected to directional coupling members 12. The rails 11 are of identical construction, and, in the embodiment shown, are of triangular cross-sectional configuration.

Figure 6:
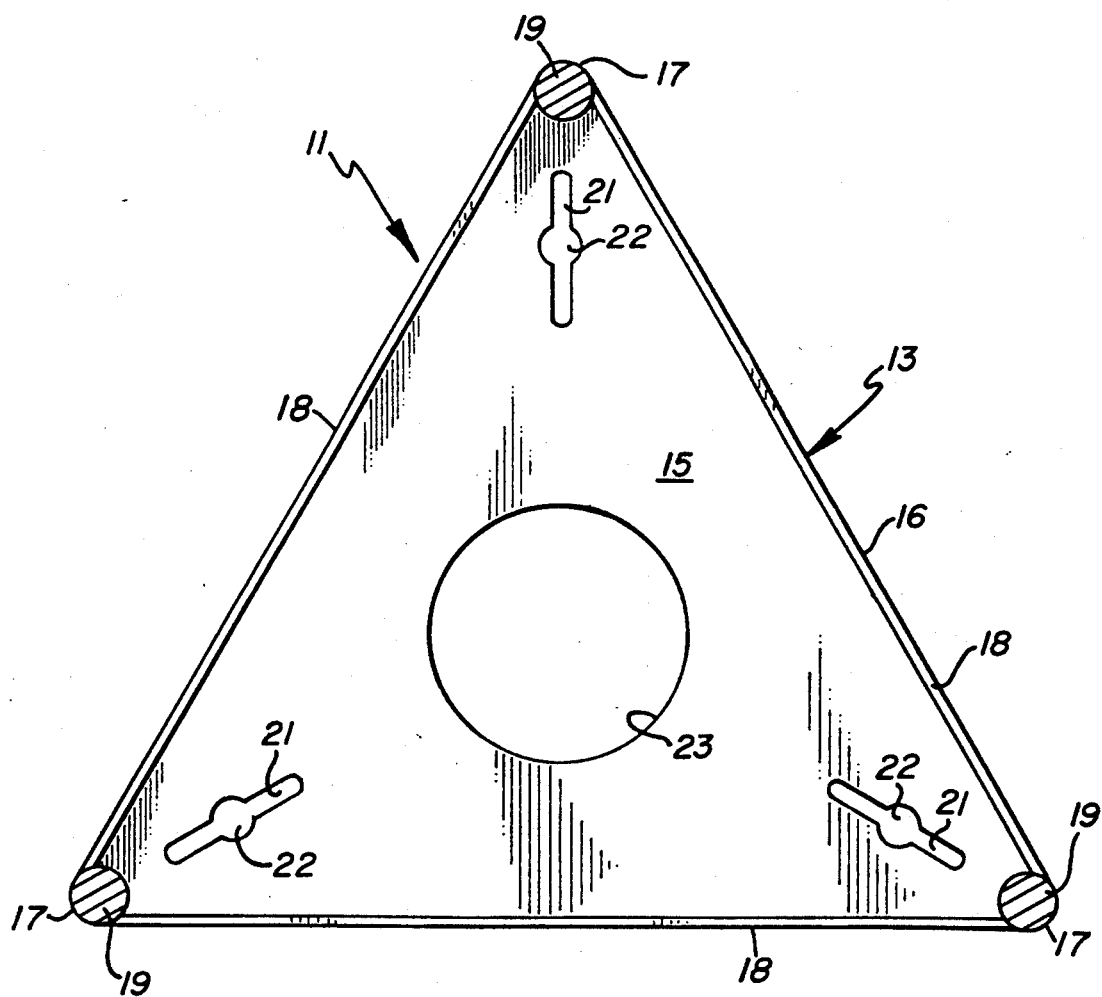

Each rail 11 includes a pair of substantially flat end plates 13 which are of triangular configuration each having a flat outer surface 14 and a substantially flat inner surface 15. Referring now to FIG. 6, it will be seen that the respective side edges 16 of each end plate are of equal length so that the side plates define an equilateral triangle. The apices 17 of the end plates are curved and each end plate has a flange 18 integrally formed therewith and projecting therefrom towards the other end plate.

The end plates 13 for each rail are disposed in substantially parallel relation with respect to each other and each is rigidly interconnected to the ends of longitudinally extending rail elements 19. In the embodiment shown, the longitudinal rail elements 19 engage the curved apical portion of the end plates and the flanges 18 and are rigidly secured thereto by welding. In the embodiment shown, three longitudinal rail elements are provided and these rail elements are laterally spaced apart and are disposed in substantially parallel relationship with each other.

It will be seen that adjacent longitudinal rail elements 19 are fixidly connected to transverse load transferring rail elements 20 so that any load exerted on rail 11 will be evenly transferred to the longitudinal rail elements 19. In the embodiment shown, each pair of longitudinal rail elements are interconnected by single transverse rail element 20 which is angularly bent and welded to the longitudinal rail elements.

It will be noted that each of the end plates 13 is provided with a plurality of elongate slots 21 therein, each slot having an enlarged circular central portion 22. It will further be noted that each end rail also has an enlarged central opening 23 therein. The slots 21 in each end plate are arranged in a predetermined pattern, and, in the embodiment shown, each elongate slot bisects the angle defined by the adjacent edges of the plate. Therefore if a center line were drawn through each slot, such a center line would be disposed substantially normal to the opposite edge of the plate.

The rails 11 are a basic structural unit of the support system and these rails may be interconnected in end-to-end relation to generate an overall rail length of any substantial length, given the constraints of good design and structural characteristics. When a pair of rails 11 are disposed in end-to-end relation, each elongate slot 21 in one end plate will be disposed in registering relation with a slot 21 in the abutting end plate.

Suitable quick-connect over-center cam actuated toggle connector devices 24 are insertable through these registering openings for interlocking a pair of rails together in end to end relation. It will be seen that three of the quick connect over-center cam actuated toggle connector devices 24 are used to interconnect a pair of rails together. Each toggle connector device 24 includes an elongate locking link 25 which is of circular cross-sectional configuration and which has one end thereof pivotally connected to one end portion of an elongate over center cam link 26 by pivot 27. It will be seen that the locking link 25 has an opening therethrough adjacent the free end thereof and an elongate spring pin 28 is secured in the opening and projects outwardly from both sides thereof. The spring pin 28 is shaped and dimensioned to pass through a slot 21 when the spring pin is aligned with the slot. The locking link 25 which is slightly smaller in cross-sectional area than the enlarged circular position 22 will be inserted through the opening 22 during the locking operation.

The cam link 26 includes an elongate flat handle portion 29 having a substantially flat upper handle surface 29a. A pair of laterally spaced apart cam lobes 30 are integrally formed with the handle portion 29 and project therefrom. The pivot 27 is actually a nut and bolt assembly upon which the cam link 24 is journaled. Each of the cam lobes 30 has a curved cam surface portion 31 and a flat locking surface portion 31a which is a continuation of the cam surface 31.

A helical spring is positioned around the locking link 25 and is positioned within a cylindrical overload cup 33. The bottom wall 34 of an overload cup 33 has an opening therein through which the locking link 25 projects. A cam follower element 35 in the form of a washer is positioned around the locking link 25 and is disposed in engaging relation with a helical spring 32 positioned around the cam link 26.

Figure 5:
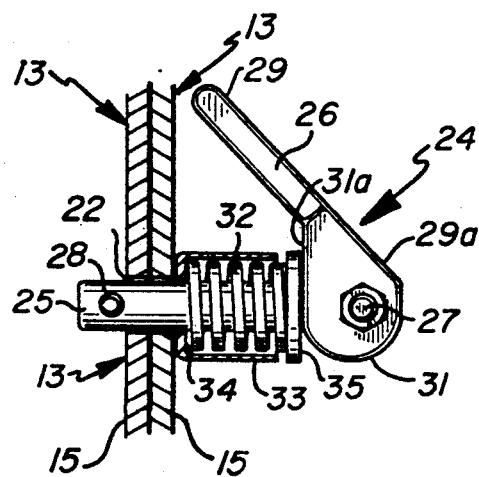

It will be noted that the pivotal axis between the cam link 26 and locking link 25 is eccentrically located with respect to the cam link 26. When a pair of rails 11 are interconnected together, each toggle link connector device 24 while in the unlocked condition (FIG. 8) will be inserted through registering openings in abutting end plates 13. The connector device 24 will then be rotated about the longitudinal axis of the locking link 25 to move the locking pin 28 out of aligned relation with respect to the key way portions of the opening 21. Thereafter, the cam link 26 will be pivoted to the over center locked position as illustrated in FIGS. 5 to thereby cam the locking pin 28 and over load cup 33 into clamping relation with respect to the abutting end plates. The application of the connector devices 24 to abutting rails may be quickly done with a minimum of effort. The locking link 26 is retained in the locking position by the force exerted by the spring 32. Similarly, the connector devices 24 may be readily shifted to the unlocked condition to permit removal of the connector devices and disconnection of abutting rails. This arrangement permits rails to be readily connected in end-to-end abutting relation without requiring any tools. The overload cup 33 limits the compressional force exerted on the spring 32.

Figure 3:
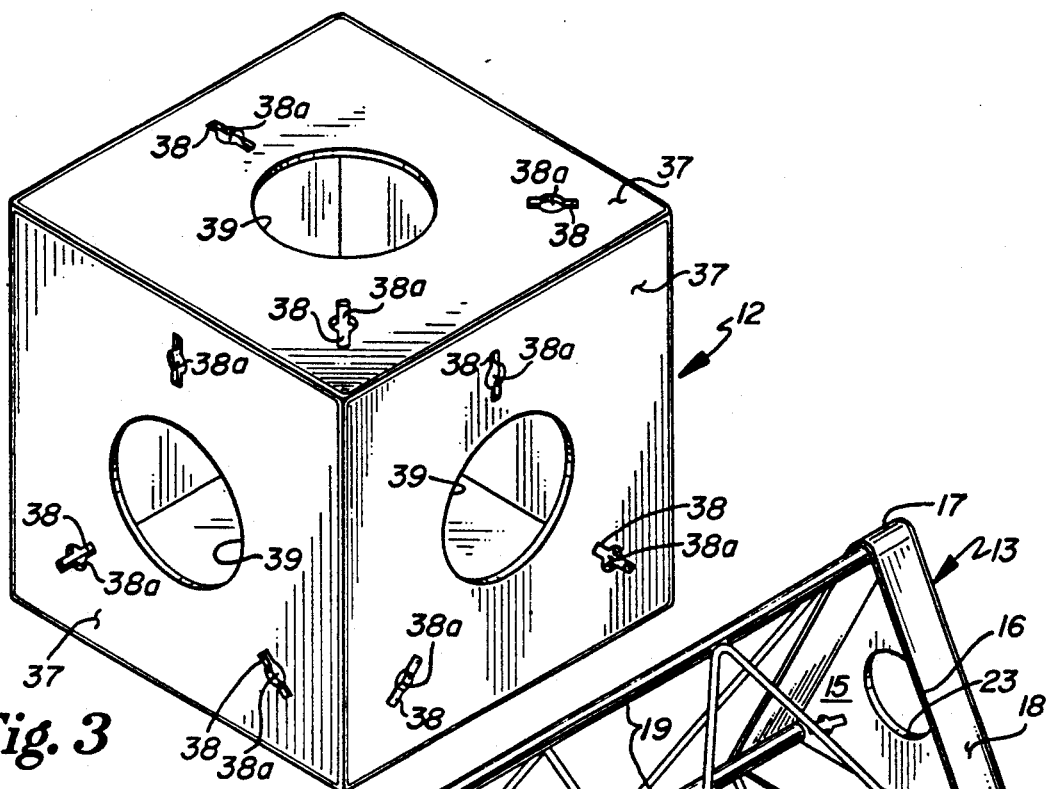
Figure 2:
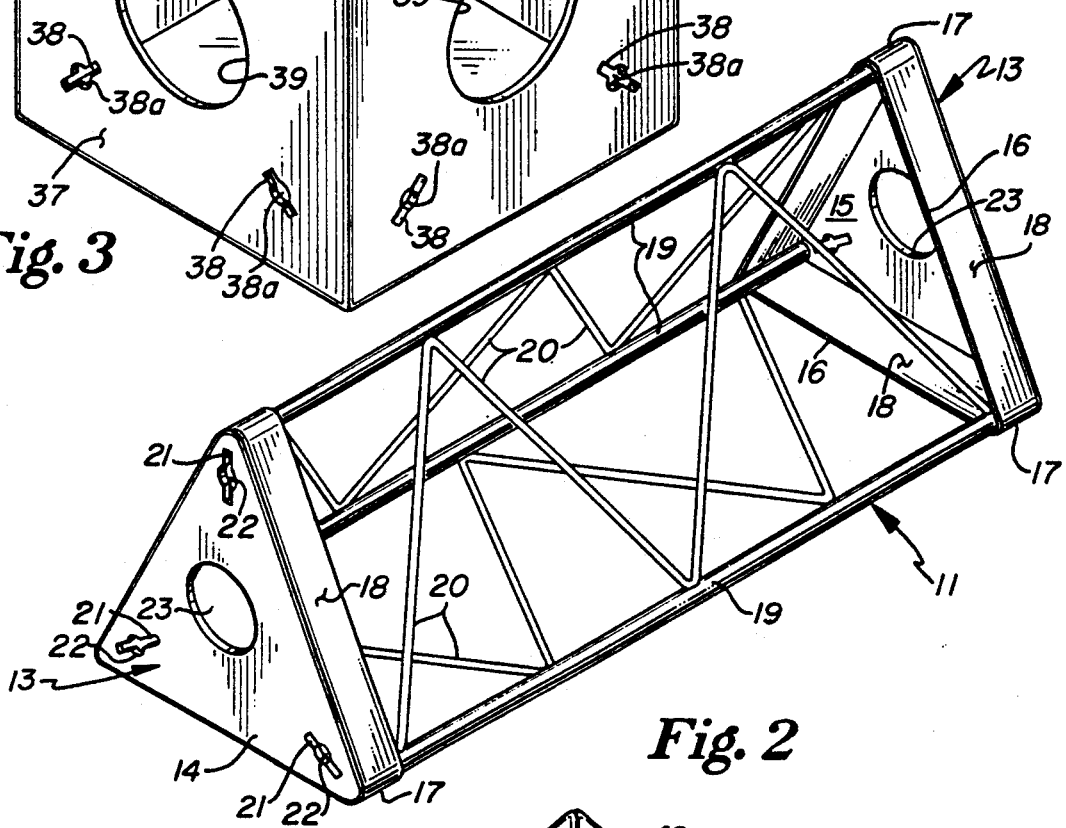

Referring now to FIGS. 1 and 3, it will be seen that rail elements 11 are also connected to hollow directional coupling members 12 by the cam actuated toggle connector devices 24. In this regard, it will be seen that each directional coupling member 12 is of box-shaped cubical configuration and is comprised of walls 37 each presenting a planar outer surface. Each of the walls 37 has a plurality of slots 38 therein each slot including an enlarged central portion 38a. The directional coupling members 12, which are preferably formed of light weight metal, interconnect rail members together in right angular relationship with respect to each. It will be noted that the slots 38 are arranged in the same predetermined manner as the slots 21 in the end plates 13 of the rails 11. It will further be noted that each side 37 of the coupling member 12 also has a central circular opening 39 therein.

It will therefore be seen that when an end plate 13 of rail 11 is positioned in abutting relation against one of the sides 37 of a directional coupling member 12, each slot 21 in the abutting end plate will be disposed in registering relation with a slot 38 in the abutting side 37. Each opening 23 in the abutting end plate will be disposed in registering relation with an opening 39 in the abutting side 37. In this regard, the openings 39 correspond in size to the openings 23 in the end plates 13 of the rails 11. The cam actuated toggle connector devices 24 may then be used to readily secure a plurality of rails 11 to a directional coupling member 12 so that the rails are disposed in right angular relationship with respect to each other. For example, certain of the rails 11 may be disposed in vertical relationship to define legs or a vertical support for the support system 10. Other rails may be connected to the directional coupling members 12 in horizontal orientation to serve as horizontal support members. The vertical and horizontal dimensions of a support system may therefore be varied over a wide range of sizes.

Figure 4:
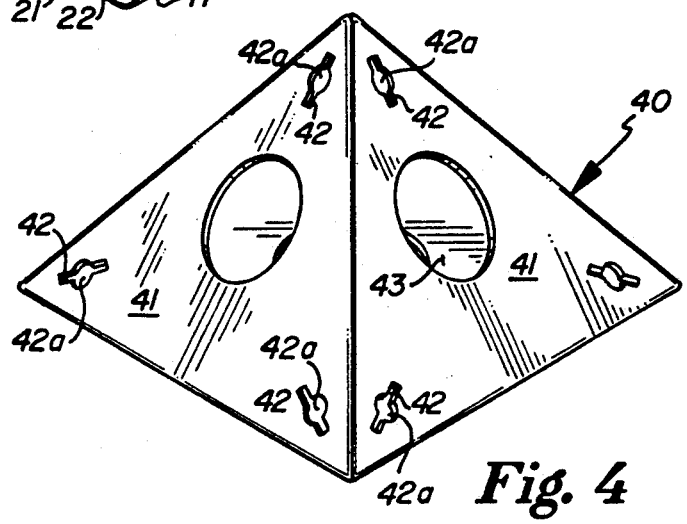

Referring now to FIGS. 4 and 7, it will be seen that a different embodiment of a directional coupling member, designated generally by the reference numeral 40, is thereshown.

The directional coupling member 40 is of pyramidal configuration is comprised of four triangular sides 41 secured to a square base (not shown). Each of the sides 41 defines an equilateral triangle and each side has a plurality of elongate slots 42 therein, each slot having an enlarged central circular portion 42a. The slots 42 for each side 41 are arranged in the same predetermined pattern as the pattern of the slots in the end plates 13 for the rails 11. Each side 41 also has a central circular opening 43 therein which corresponds in size to the opening 23 in each end plate 13 of a rail.

When the end plates of a rail 11 are positioned in abutting relation with one of the sides 41 of the directional coupling member 40, each slot in an end plate will be disposed in registering relation with a slot in the side 41 of a directional coupling member 40. The cam actuated toggle connector devices 24 may then by readily applied to the abutting end plate and side 41 to interconnect a rail to the directional coupling member 40. The directional coupling member 40 permits rails to be interconnected thereto in a different angular relation than the right angular relation of the rails connected to the directional coupling members 12. Although the directional coupling member 12 is of cubical configuration and directional coupling member 40 is of pyramidal configuration, coupling members having different configurations may also be used for interconnecting rails together at various angles. The only requirements for such coupling members is that it (coupling member) include flat coupling surfaces having a slot pattern in each surface corresponding to the slot pattern in the end plates. By varying the configuration of the directional coupling members, support structures of varying configuration may be erected.

The support system has special utility in the entertainment field. In this regard, the support system may be constructed to support a lighting system (i.e. spot lights, accent lights, colored lights) to emphasize a particular scene. The support system may be used in the construction of an actual stage for an entertainment event and may also provide for all the lights and equipment. Similarly, the support system may also be used as a display setting. Display settings usually include booths, signs, lights and other displayed paraphernalia. The present support system is readily adaptable for the provision of these features. The support system may also be used as temporary structures such as tents, shading canopies, scaffolding and the like.

The unique construction and design of the rails 11 permit ready generation of rail structures of varying lengths while maintaining the structural integrity of the rail structure. The use of the quick-connect, over-center toggle connector devices for interconnecting rails in end-to-end relation and for interconnecting rails to directional coupling members permits the components of the support system to be readily assembled and disassembled while obviating the need of any tools during the assembly and disassembly.

The use of directional coupling members together with the over-center connector devices permits the erection of support systems capable of a wide range of configurations. In the preferred embodiment, the rails and the directional coupling members are preferably constructed of aluminum so that the system is of light weight construction. When the support system is disassembled, the various components may be stacked and stored in a storage area of small compass. It is pointed out that when the support system is in the erected position, the central openings 23 in the end plates of rails 11 will be disposed in aligned relation with each other and will also be disposed in aligned relation with the openings 39 in the directional coupling members 12 or the openings 43 and the directional coupling members 40. These aligned openings define a pathway through which cables or wires may be readily passed while minimizing any damage to the cable or wire.

From the foregoing, it will be seen that we have provided a novel support system, which is not only of simple and inexpensive construction, but one which functions in a more efficient manner than any heretofore known comparable system.

what is claimed is:

1. A sectional rail structure for a support system used in supporting lights, video monitors and similar devices, comprising, a plurality of elongate similar rails, each including a plurality of elongate, laterally spaced-apart, parallel longitudinal rail elements, each rail including a plurality of elongate, transversely extending rail elements extending between and being rigidly connected with a pair of adjacent longitudinal rail elements, each rail including a pair of longitudinally spaced apart substantially identical end plates, each end plate having inner and outer surfaces, one of said end plates being rigidly secured to the end portions of the longitudinal rail elements at one end of a rail, the other of said end plates being rigidly secured to the end portions at the other end of a rail, each end plate having a plurality of similar spaced apart openings therein arranged in a predetermined pattern whereby when a pair of rails are disposed in end-to-end abutting relation, with the outer surface of one end plate being disposed in confronting relation with the outer surface of the end plate of the adjacent rail, each opening in one end plate will be disposed in registering relation with an opening in the abutting end plate, and a plurality of substantially identical, quick-connect toggle connector devices releasably securing abutting rails together, each connector device including a pair of elongate toggle links pivotally connected together for pivoting movement between locked and released positions, one of said links having a locking element thereon and being inserted through registering openings in the abutting end plates and securing the rails together upon rotation of a connector device and pivoting movement of the links thereof from the release to the locking position.

2. The sectional rail structure as defined in claim 1 wherein each of said end plates for each rail is of triangular configuration.

3. The sectional rail structure as defined in claim 2 wherein each end plate for a rail has apices, each opening in an end plate comprising a slot being located adjacent an apex in the end plate.

4. The sectional rail structure as defined in claim 1 wherein each of said toggle connector devices are pivoted through an overcenter position when shifted between locked and release positions.

5. A support system for supporting lights, video monitors and similar devices, comprising, a plurality of elongate similar rails, each including a plurality of elongate, laterally spaced-apart, parallel longitudinal rail elements, a plurality of elongate, transversely extending rail elements extending between and being rigidly connected with a pair of adjacent longitudinal rail elements, each rail including a pair of longitudinally spaced apart end plates, rigidly secured to the end portions of the longitudinal rail elements each end plate having a plurality of similar spaced apart openings therein arranged in a predetermined pattern whereby when a pair of rails are disposed in end-to-end abutting relation, each opening in one end plate will be disposed in registering relation with an opening in the abutting end plate, a plurality of substantially identical, quick-connect toggle connector devices releasably securing abutting rails together, each connector device including a pair of elongate toggle links pivotally connected together for pivoting movement between locked and released positions, one of said links having a locking element thereon and being inserted through registering openings in the abutting end plates and securing the rails together upon rotation of a connector device and pivoting movement of the links thereof from the release to the locking position, and a plurality of directional coupling members, each coupling member having a plurality of flat sides, each side having a plurality of openings therein arranged in the same predetermined pattern as the openings in the end plates of a rail whereby when an end plate of a rail is disposed in abutting relation with a side of directional coupling member each opening in the abutting end plate will be disposed in registering relation with an opening in the abutting side of a directional coupling member, and a plurality of said connector devices connecting a rail to a side of a coupling member.

6. The support system as defined in claim 5 wherein said coupling members are of hollow cubical configuration.

7. The support system as defined in claim 5 wherein said coupling members are of hollow pyramidal configuration.

* * * * *